United States Patent [19]

Sakamoto et al.

[11] Patent Number: 5,061,410

[45] Date of Patent: Oct. 29, 1991

[54] PROCESS FOR PRODUCING MICROCAPSULES

[75] Inventors: Masahiro Sakamoto; Shozo Harada, both of Kanagawa, Japan

[73] Assignee: Juju Paper Co., Ltd., Tokyo, Japan

[21] Appl. No.: 507,050

[22] Filed: Apr. 10, 1990

[30] Foreign Application Priority Data

Apr. 12, 1989 [JP] Japan .................................. 1-92292

[51] Int. Cl.$^5$ .............................................. B01J 13/18
[52] U.S. Cl. .................................. 264/4.7; 428/402.21; 503/215
[58] Field of Search .................... 264/4.7; 428/402.21; 503/215

[56] References Cited

U.S. PATENT DOCUMENTS

| | | | |
|---|---|---|---|
| 4,100,103 | 7/1978 | Foris et al. ........................ | 264/4.7 X |
| 4,251,386 | 2/1981 | Saeki et al. ........................ | 264/4.7 |
| 4,444,699 | 4/1984 | Hayford ............................. | 264/4.7 |
| 4,450,123 | 5/1984 | Egawa et al. ...................... | 264/4.7 |
| 4,490,313 | 12/1984 | Brown et al. ...................... | 264/4.7 |
| 4,552,811 | 11/1985 | Brown et al. ...................... | 264/4.7 |
| 4,574,110 | 3/1986 | Asano et al. ...................... | 264/4.7 X |
| 4,746,467 | 5/1988 | Sakamoto et al. ................. | 264/4.7 |
| 4,753,759 | 6/1988 | Fukuo et al. ...................... | 264/4.7 |
| 4,957,666 | 9/1990 | Kawamura et al. ............... | 264/4.7 |

*Primary Examiner*—Richard D. Lovering
*Assistant Examiner*—John M. Covert
*Attorney, Agent, or Firm*—Sherman & Shalloway

[57] ABSTRACT

The process of the present invention uses an aminoaldehyde polycondensate as capsule-wall and a hydrophobic core material dispersed in an aqueous acidic solution containing an anionic water-soluble colloidal substance, wherein it is characterized in that the anionic water-soluble colloidal substance comprises a mixture of an anionic water-soluble substance having a high viscosity and that having a low viscosity.

The process of the present invention provides a slight viscosity rise in the encapsulation, a capsule slurry with a high concentration, low viscosity, and a slight smudging in the application as a pressure-sensitive recording sheet and the like, compared with the conventional processes.

9 Claims, No Drawings

PROCESS FOR PRODUCING MICROCAPSULES

BACKGROUND OF THE INVENTION

1. Field of the Invention

The present invention relates to a process for producing microcapsules which use an aminoaldehyde polycondensate as a capsule-wall for the purpose of changing or controlling various properties of substances in such field as pharmaceuticals, agricultural chemicals, perfumes, liquid crystals, pressure-sensitive recording papers, heat-sensitive recording papers, and the like. More specifically, the present invention relates to a process for producing microcapsules which have an aminoaldehyde polycondensate wall effective for pressure-sensitive recording sheets.

2. Prior Art

The process for the present invention belongs to an in situ polymerization process, a chemical process in which a capsule wall composed of an aminoaldehyde polycondensate is formed by a reaction starting from the continuous phase.

The use of amine/aldehyde polycondensate or urea-/aldehyde polycondensate for forming the wall film has already been disclosed in, for example, Japanese Patent Publication Nos. 37-12380, 44-3459, 47-23165 and the like. This process has the defects that the emulsification or dispersion is not efficiently achieved, or that it is difficult to efficiently and stably deposit the polycondensate around the hydrophobic core material.

In order to improve the above-mentioned defects, the use of acrylic acid polymers or copolymers as an anionic polyelectrolyte is disclosed in Japanese Patent Publication 54-16949, Japanese Patent Laid-Open Application Nos. 58-14942, 59-142836, 60-28819, 60-68045, 60-190227, 60-216838, 60-238140, 61-11138, 61-17491, 62-19238, 62-57645, 62-97638, 62-250943 and 63-134084. The processes of the above disclosures have the following problems requiring some improvements. Although the process of the Japanese Patent Publication 54-16949 improves the depositing efficiency of the polycondensate around the core material, it has the defects that the resultant capsule slurry exhibits a very high viscosity.

Japanese Patent Laid-Open Application Nos. 58-14942, 59-142836 and 60-68045 disclose a capsule slurry having a high-concentration, a low viscosity and a good particle size distribution. However, they provide as a defect a capsule slurry having an undesirable high viscosity at a higher slurry concentration.

Japanese Patent Laid-Open Application Nos. 60-190227, 60-216838, 60-238140, 61-11138, 61-17491, 62-19238, 62-57645, 62-97638, 62-250943 and 63-134084 provide a capsule slurry having a higher concentration and a lower viscosity in the use of the described anionic polyelectrolyte, but they provide as a defect a worse particle-size distribution. In using the capsules obtained by these conventional processes for pressure-sensitive recording sheets, the higher concentration and lower viscosity described above cause an economical advantage due to the high-speed coating, but the worse particle-size distribution has the defects of causing a smudging in the color-information and further a spot-like smudging on the surface of recording sheet. Furthermore, in a single-type pressure-sensitive recording sheet, a self-contained paper, a spot-like smudging appears remarkably.

SUMMARY OF THE INVENTION

It is an object of the present invention to provide the improvement in a process for producing microcapsules which use an in-situ polymerization process forming a capsules wall composed of aminoaldehyde polycondensate by a reaction starting from the continuous phase, that is, to provide superior emulsifying ability, a good emulsion stability, a slight viscosity increase in a capsule-forming reaction and a capsule slurry with higher concentration, lower viscosity and narrow particle-size distribution.

It is another object of the present invention to provide a good capsule-film impermeability, a superior runnability, a slight smudging and a reduced spot smudging in the color-formation under using a pressure-sensitive recording sheet.

The above mentioned objects of the present invention can be achieved by using a mixture of an anionic water-soluble colloidal substance having a high viscosity and an anionic water-soluble colloidal substance having a low viscosity, a viscosity ratio of the high viscosity to the low viscosity being at least 10 to 1 at a concentration of 25% by weight of each of anionic water-soluble colloidal substances, in a process for producing microcapsules which use an aminoaldehyde polycondensate as a capsule-wall in a system in which a hydrophilic core material is dispersed or emulsified in an aqueous acidic solution containing an anionic water-soluble colloidal substance.

DETAILED DESCRIPTION OF THE INVENTION

As the anionic water-soluble colloidal substance of the present invention, there can be used acrylic acid-base substances, maleic anhydride-base substances and styrene-sulfonic acid-base substances. However, the acrylic acid-base substances are practically useful since they can be easily controlled from high viscosity to low viscosity in a constant condition. The acrylic acid base water-soluble polymers includes the polymers and copolymers of acrylic acid. The examples for the copolymers of acrylic acid include the salts (K, Na-salts) of acrylic acid/itaconic acid copolymer, acrylic acid/itaconic acid/alkyl acrylate copolymer, acrylic acid/alkyl acrylate/alkyl methacrylate copolymer, acrylic acid/-maleic anhydride-copolymers, the salts (Li, Na, K, Ca-salts) thereof, acrylic acid/maleic anhydride/alkylacrylate/styrene copolymer, acrylic acid/alkylacrylate/alkylmethacrylate/hydroxyalkylmethacrylate copolymer, acrylic acid/acrylonitrile copolymer, acrylic acid/acrylonitrile/alkylacrylate copolymer, acrylic acid/acrylonitrile/acrylamide copolymer, acrylic acid/acrylamide copolymer, acrylic acid/acrylamide/alkylmethacrylate/alkylacrylate copolymer, acrylic acid/alkyl acrylate copolymer, acrylic acid/styrene-sulfonic acid copolymer, acrylic acid/styrenesulfonic acid/alkylacrylate copolymer, acrylic acid/styrenesulfonic acid/alkylacrylate/itaconic acid copolymer, acrylic acid/methacrylic acid/acrylonitrile/acrylamide/alkyl sulfonic acid copolymer, and the like.

The examples for maleic anhydride-base water-soluble polymers include the copolymer of maleic anhydride with vinylmethyl ether, isobutylene, vinyl acetate and styrene.

The examples for styrenesulfonic acid-base water-soluble polymers include the copolymers of styrenesulfonic-acrylic acid, styrenesulfonic-maleic anhydride, styrenesulfonic acid-acrylate, styrenesulfonic acid-vinyl acetate, styrenesulfonic acid-vinylpyrrolidone, styrenesulfonic acid-styrene, styrenesulfonic acid-vinylsulfonic acid, and the like.

In combination with the chemicals of the present invention, there can be used the anionic or nonionic water-soluble polymers such as carboxymethyl cellulose, hydroxyethyl cellulose, polyvinyl alcohol, cellulose-sulfonate, lignin sulfonate, gum arabic, polyethylene sulfonic acid and the like, in an amount of not decreasing the function of the water-soluble polymer of the present invention, that is, in an amount of at most 20–30 weight-%.

The anionic water-soluble polymer of the present invention is produced preferably by a radical polymerization process under using a hydrogen gas, that is, by a conventional process for polymerizing an acrylic acid as follows. The mixture of the above monomers is placed in a vessel diluted with water to obtain an aqueous solution of an appropriate concentration. Then, the air in a vessel is substituted with nitrogen gas. An organic or inorganic peroxide or persulfate as a polymerization initiator is added to the solution, heated to carry out a polymerization reaction. However, an emulsion-polymerization process can be adopted for controlling a polymerization state. After the completion of a reaction, a part of the polymer is additionally neutralized with a hydroxide of alkali metal such as sodium hydroxide, etc. In general, the radical polymerization process in an aqueous system provides an aqueous polymer solution containing 5–30 weight-% of non-volatile components.

Preferably, the composition of the monomer as a raw material of the acrylic acid-base anionic water-soluble polymers consists of 50–92% by weight of acrylic acid and an appropriate weight of other monomers in order to carry out a sufficient encapsulation reaction. (Hereinafter, % means % by weight.)

For example, a composition ratio of acrylic acid/itaconic acid ranges 80–90%/20–5%, a ratio of acrylic acid/itaconic acid/alkylacrylate ranges 75–90%/1–10%/1–10%, a ratio of acrylic acid/styrene sulfonic acid/alkyl acrylate ranges 70–90%/2–15%/2–10% and a ratio of acrylic acid/methacrylic acid/acrylonitrile/acrylamide alkylsulfonic acid ranges 40–70%/1–10%/5–3%/5–30%.

Any of the above water-soluble copolymers can be easily encapsulated to obtain an aminoaldehyde polycondensate as a capsule wall. In order to perform the purpose of the present invention, it is required to use a mixture of a water-soluble polymers having a high viscosity and that having a low viscosity, that is, a mixture of a high-molecular weight polymer and a low-molecular weight polymer.

In the present invention, the term "high viscosity" means a viscosity of at least 5,000 cps, whereas the term "low viscosity" means a viscosity of at most 500 cps.

The single use of a water-soluble polymer having a high viscosity in an amount sufficient for the capsule-forming reaction provides an undesirable high viscosity in emulsifying, encapsulating-reaction and capsule-slurry, a worse runnability and a reduced yield. On the other hand, the single use of a water-soluble polymer having a low viscosity is undesirable owing to the troublesome capsule-formation, the wide particle-size distribution and ununiform capsule particle-size.

The single use of a water-soluble polymer having an intermediate viscosity between a high viscosity and a low viscosity provides an undesirable high viscosity in encapsulating-reaction and a capsule-slurry, and a worse capsule-particle-size distribution. In the acrylic acid-base water-soluble polymer used in the present invention, the relation between the molecular weight (GPC-average molecular-weight) and the viscosity is as follows. The polymer having a high viscosity range of 5,000–1,500,000 cps is calculated into an average molecular weight range of circa 1,200,000–5,000,000, and a low viscosity range of 100–500 cps is calculated into an average molecular weight range of circa 200,000–600,000.

The viscosity of the water-soluble polymer of the present invention is measured at 25° C. by using a Brookfield viscometer for the solution containing 25% by weight of non-volatile components.

The present invention has a feature in that a water-soluble polymer having a high viscosity and that having a low viscosity is mixed in an appropriate weight-ratio, preferably a weight-ratio of 1:12 to 1:3. The viscosity after the mixing is preferably 500–2,000 cps.

The water-soluble polymer of the present invention can be used in the form of an anhydride or partial metal salt, and lithium, sodium-, potassium-, magnesium- or calcium-salt is preferable.

The process of the present invention is carried out as follows.

(1) Preparation of the core material

A hydrophobic liquid as a core material of microcapsules is used as such or after dissolving other substances.

(2) Preparation of the continuous phase

The anionic water-soluble polymer of the present invention is dissolved in a city water at a room temperature, and further, either amine or aldehyde or precondensate thereof to be encapsulated is dissolved into the resultant solution to form a continuous phase, wherein this precondensate can be modified with a phenolic substance, or benzoguanamine, or the like.

The weight-ratio (as solid) of the material to be encapsulated to the core material ranges from circa 1:1 to circa 1:20. Aminoaldehyde as a material to be encapsulated can be used alone, or in form of prepolymer, if they are dissolved in a continuous phase. Examples of the amines of the present invention include urea, thiourea, melamine, their alkylates having 1–4 carbon atoms, methylolate, methylol alkylate having 1–4 carbon atoms, and mixture thereof. Examples of aldehydes of the present invention include formalydehyde, paraformaldehyde, glyoxal, glutaraldehyde, and the like. Among them, formaldehyde is preferable.

(3) Emulsification

The core material solution is added to the above continuous phase under stirring, emulsified with an emulsifying machine such as homogenizer, static mixer, etc. Preferably, the emulsification is carried out at room or temperature or lower to obtain a good particle-size distribution.

(4) Reaction for forming capsule walls

After the emulsified particles of predetermined particle-sizes are obtained, the solution is adjusted to a pH-range for polycondensing capsule wall-forming material. With acidic pH-value, the impermeability of the capsule-wall is increased. The smaller the pH-value, the faster the reaction rate. If the reaction is too fast, however, the formation of uniform capsule walls is prevented. Taking into consideration this fact and the like, the pH-value should be adjusted to circa 3. The weight ratio of the amine to the aldehyde is not otherwise determined. Generally, the aldehyde is used in an amount of 0.5-5.0 moles, based on 1 mole of the amine. In using a urea-formaldehyde system, formaldehyde is preferably used in an amount of 1.2-3.0 moles, based on 1 mole of urea.

After completion of the emulsification or with the addition of aldehyde, the system is heated to 35°-90° C. Usually, the temperature is adjusted to 50°-75° C. After a set temperature is reached, the temperature should be maintained preferably for more than a predetermined period. At a set temperature of 50°-60° C., this temperature should be maintained for a least one hour.

(5) After-treatment

After the reaction for forming capsule walls is completed, treatments such as a temperature control, a pH-control, a washing-out, a filtration, a drying, a pulverization, etc. are carried out in accordance with the purposes of the present invention. In using formaldehyde as an aldehyde, there is carried out the treatment for removing the excess formaldehyde remained in the capsule slurry.

In emulsifying and encapsulating a mixture of an anionic water-soluble polymer having a high-viscosity and that having a low-viscosity, the polymer having a high-viscosity provides a faster emulsifying rate, an improved particle-size distribution and a higher film impermeability. On the other hand, the polymer having a low-viscosity provides a low slurry viscosity through an emulsification and an encapsulating process. As the result, it is thought that there is obtained a capsule slurry having high-concentration, low-viscosity and narrow particle-size distribution.

However, a single use of a polymer having a high-viscosity provides a viscosity-increase in an encapsulating reaction and in a capsule slurry, and worse capsule particle-size distribution.

The reason for providing the undesired effect is not clear. Further, a polymer having the same viscosity as a mixture of the present invention is prepared by a polymerization. The single use of the obtained polymer exhibits both a remarkably undersired effect of the polymer having a high-viscosity and a remarkably undesired effect of that having a low viscosity, which cannot be explicated.

In Synthesis examples and Examples described hereafter, parts means parts by weight as solid.

EXAMPLE 1

(1) Preparation of an anionic colloidal substance (A) Synthesis of the substance having a high viscosity 650 g of water were placed in a 2l-flask fitted with reflux cooler, thermometer, nitrogen introducing pipe, low dropping funnels were heated to 83°-85° C. under stirring. At this temperature, a mixed solution of 305 g of acrylic acid, 27 g of styrenesulfonic acid, 27 g of butyl acrylate and 137 g of water was placed in a dropping funnel, and a solution containing 0.61 g of potassium persulfate dissolved in 150 g of water was placed in another dropping funnel. The mixed solution and the potassium persulfate solution were added dropwise into a flask for one hour, and were maintained at the same temperature for 2 hours. Further, a solution dissolving 1.44 g of potassium persulfate in 50 g of water was added thereto and maintained at the same temperature for 1 hour to complete the reaction.

After cooling, 11 g of 48% aqueous solution of sodium hydroxide were added thereto neutralized, diluted with water to thereby obtain a 25% aqueous solution of an anionic water-soluble polymer composed of acrylic acid/sodium styrene sulfonate/butylacrylate of 85/7.5/7.5. The viscosity of obtained polymer was 170,000 cps when it is measured at 25° C. by using a Brookfield viscometer.

(B) Synthesis of the substance having a low viscosity 600 g of water were placed in a 2l separable round bottom flask equipped with a reflux cooler, a thermometer, a nitrogen inlet and two dropping funnels. The water was heated with stirring to 83°-85°. A mixed solution containing 305 g of acrylic acid, 2.7 g of sodium styrene sulfonate and 100 g of water was charged in a dropping funnel, and a persulfate solution dissolving 9.55 g of potassium persulfate in 200 g of water was charged in another funnel. At the above temperature, the mixed solution and the persulfate solution were added dropwise into the flask for a long time, respectively, and were maintained for 3 hours, and cooled. Further, 11 g of 48% sodium hydroxide solution were added thereto, neutralized, diluted with water to obtain a 25% aqueous solution of anionic water-soluble polymer having acrylic acid/styrene sulfonate/butylacrylate of 85:7.5:7.5. The viscosity of the above polymer was 720 cps. In this manner, an anionic water-soluble polymer No. 1 used in Example 1 was prepared by mixing an anionic water-soluble polymer having a high viscosity and the having a low viscosity in a weight-ratio of 1/6.

(2) Preparation of capsules having a wall film composed of urea/formaldehyde 28 parts of the above cationic water-soluble polymer No. 1 were added to 72 parts of water and dissolved. Further, 10 parts of urea and 1.2 parts of resorcinol were added thereto to prepare an aqueous solution. The aqueous solution was adjusted to a pH-value of 3.4 by using a 40% citric acid solution. On the other hand, 6 parts of Crystal Violet Lactone as a colorless dye were added to 148 parts of a high-boiling solvent composed substantially of phenylxylylethane and dissolved under stirring while heated to 90° C. to prepare a core material. The core material was mixed with the above prepared aqueous solution containing the anionic water-soluble polymer No. 1, urea and resorcinol while paying attention to the phase inversion to prepare a mixture. The mixture was adjusted to a temperature of 30° C., emulsified to an average particle-size of 4.7μ by using a homomixer. Then 27.5 parts of water and 23.5 parts of 37% formaldehyde solution were added thereto, and heated to 55° C. The reaction for forming capsule walls was continued for 2 hours at 55° C. to complete an encapsulating reaction. In order to remove the amount of the residual formaldehyde, the mixture was cooled to 40° C., and 28% ammonia water was added until the pH was 7.5. Thus, a capsule slurry for a pressure-sensitive recording sheet was obtained.

EXAMPLES 2-8

The water-soluble polymer having a high viscosity and that having a low viscosity were synthesized in the same manner as in Example 1 from the monomers in the composition-ratio as shown in Table 1. They were mixed in a ratio shown in Table 1 to obtain water-soluble polymers Nos. 2-8 used in Examples 2-8. Water-soluble polymers having a high viscosity, those having a low viscosity and the mixture of the above two water-soluble polymers were indicated in Table 1 for a viscosity.

The capsules were formed in the same manner as in Example 1, using the water-soluble polymers of samples Nos. 2-8. The viscosity rise in the encapsulation, the viscosity of capsule slurry, the particle size-distribution of microcapsules and the smudging in color-formation were measured and summarized in Table 2.

same manner as in Example 1. The test results of these capsules were summarized in Table 2.

As will be obvious from Table 2, the single use of the water-soluble polymer having a medium viscosity or high viscosity, in Comparative Examples 1, 2 and 4, provides a higher capsule-slurry-viscosity than the process of the present invention. The single use of the water-soluble polymer having a low viscosity, as shown in Comparative Examples 3 and 5, provides an inferior particle size-distribution and a worse smudging in the color formation. The use of mixed water-soluble polymers having a viscosity-ratio of less than 10, as shown in Comparative Example 6, exhibits an inferior particle-size distribution and a worse smudging inspite of a low slurry viscosity.

TABLE 1

| | | Preparation of anionic water-soluble polymer | | | | |
|---|---|---|---|---|---|---|
| | | Viscosity (CPS) | | | Properties of a blend of a polymer having a high viscosity and a polymer having a low viscosity | |
| Sample | Composition (weight ratio) | Polymer having a high viscosity | Polymer having a low viscosity | Viscosity ratio | Blend ratio | Viscosity (CPS) |
| No. 1 | AA/NaSS/BA = 85/7.5/7.5 | 170,000 | 235 | 720 | 1/6 | 770 |
| No. 2 | AA/NaSS/BA = 85/7.5/7.5 | 12,000 | 235 | 50 | 1/3 | 650 |
| No. 3 | AA/NaSS/BA = 85/7.5/7.5 | 1,400,000 | 235 | 5960 | 1/12 | 705 |
| No. 4 | AA/NaSS/BA = 85/7.5/7.5 | 170,000 | 140 | 1210 | 1/6 | 560 |
| No. 5 | AA/NaSS/BA = 85/7.5/7.5 | 170,000 | 470 | 360 | 1/4 | 890 |
| No. 6 | AA = 100 | 135,000 | 420 | 320 | 1/4 | 730 |
| No. 7 | AA/NaSS/BA/Ita = 84/6/9/1 | 92,000 | 360 | 260 | 1/6 | 730 |
| No. 8 | AA/NaSS/AM = 70/20/10 | 210,000 | 290 | 720 | 1/6 | 700 |
| No. 9 | AA/NaSS/BA = 85/7.5/7.5 | | 170,000 | | | Viscosity: |
| No. 10 | AA/NaSS/BA = 85/7.5/7.5 | | 725 | | | Solid content 25% |
| No. 11 | AA/NaSS/BA = 85/7.5/7.5 | | 140 | | | pH: 4.0 (5% aqueous |
| No. 12 | AA = 100 | | 870 | | | solution) |
| No. 13 | AA/NaSS/BA/Ita = 84/6/9/1 | | 780 | | | B type: Measured at 25° C. by using a Brookfield Viscometer |
| No. 14 | AA/NaSS/BA/Ita = 84/6/9/1 | 2,750 | 360 | 7.6 | 1/4 | 790 |

(Note)
AA: Acrylic acid
NaSS: Sodium styrene sulfonate
BA: Butyl acrylate
Ita: Itaconic acid
AN: Acryl nitrile
AM: Acryl amide

TABLE 2

| | | Evaluation of microcapsules | | | |
|---|---|---|---|---|---|
| | Sample No. | Viscosity rise in encapsulation | Viscosity of capsule slurry (CPS) | Particle-size distribution | Smude in color-formation |
| Example | | | | | |
| 1 | No. 1 | Little | 230 | 2.10 | 5.1 |
| 2 | 2 | No | 210 | 2.03 | 5.3 |
| 3 | 3 | Little | 205 | 2.10 | 5.2 |
| 4 | 4 | No | 160 | 2.20 | 5.2 |
| 5 | 5 | Little | 270 | 2.00 | 4.9 |
| 6 | 6 | Slight | 330 | 2.25 | 5.7 |
| 7 | 7 | Slight | 245 | 1.95 | 4.8 |
| 8 | 8 | Little | 250 | 1.98 | 5.0 |
| Comparative Example | | | | | |
| 1 | 9 | Very great | 770 | 1.88 | 4.9 |
| 2 | 10 | Slight | 460 | 2.40 | 6.3 |
| 3 | 11 | No | 150 | 2.61 | 6.8 |
| 4 | 12 | Great | 790 | 2.69 | 7.2 |
| 5 | 13 | Slight | 230 | 2.43 | 6.5 |
| 6 | 14 | No | 185 | 2.57 | 7.1 |

COMPARATIVE EXAMPLES 1-6

Anionic water-soluble polymers Nos. 9-14 in Table 1 were synthesized in the same manner as in Example 1. Using the above polymers Nos. 9-14, The capsule slurries of Comparative Examples 1-6 were prepared in the The capsules were evaluated by the following methods.

Viscosity: Viscosity of the capsule slurry was measured at 25° C. by using a Brookfield Viscometer.
Particle-size distribution: A product of 10 and a logarithm of a ratio in particle size between a point of 25% volume and a point of 75% volume as measured by the particle-size measuring device, Coulter Counter Model TA-II, was indicated as a particle-size distribution. The small value means a narrow particle-size distribution.

Smudging: A capsule slurry was coated on a sheet. Then, the coated sheet was laid on the color-forming surface of a sheet, and treated in a pressure of 20 Kg/cm. The colored degree was measured by a Color-Difference Meter. The smaller value means a slight smudging.

In producing microcapsules which use an aminoaldehyde polycondensate as a capsule wall in an anionic water-soluble colloid, the present invention has a feature that the anionic water soluble colloid is a mixture of an anionic water-soluble polymer having a high viscosity and that having a low viscosity, and the viscosity ratio of the high viscosity to the low viscosity is at least 10:1 at a concentration of 25% by weight.

The process of the present invention provides a slight viscosity rise in the encapsulation, a capsule slurry with a high concentration and low viscosity, and a slight smudging in the application as a pressure-sensitive recording sheet, compared with the conventional processes. Further, owing to a coating material with a high concentration the process of the present invention provides a high-speed coating and a superior drying effect.

We claim:

1. In a process for producing microcapsules which use an aminoaldehyde polycondensate as a capsule-wall in a system in which a hydrophobic core material is dispersed or emulsified in an aqueous acidic solution containing an anionic water-soluble colloidal substance, the improvement comprising, using as an anionic water-soluble colloidal substance a mixture of a first anionic water-soluble substance having a viscosity of at least 5000 cps. (measured at 25° C. and 25% solid content by using a Brookfield Viscometer; hereinafter measured in the same method), and a second anionic water-soluble substance having a viscosity of at most 500 cps., the first and second anionic water-soluble substances having a viscosity ratio of at least 10:1 at a concentration of 25% by weight of each of the first and second water-soluble substances.

2. The process according to claim 1, wherein said anionic water-soluble substance is at least one substance selected from the group consisting of acrylic acid polymers and acrylic acid copolymers.

3. The process according to claim 1, wherein the first anionic water-soluble substance is an acrylic acid polymer having a viscosity of 5,000–1,500,000 cps, and the second anionic water-soluble substance is an acrylic acid polymer having a viscosity of 100–500 cps.

4. The process according to claim 1, wherein the first anionic water-soluble substance is an acrylic acid copolymer having a viscosity of 5,000–1,500,000 cps, and the second anionic water-soluble substance is an acrylic acid copolymer having a viscosity of 100–500 cps.

5. The process according to claim 1, wherein a weight-ratio of the first and second anionic water-soluble substances ranges from 1:12 to 1:3.

6. The process according to claim 1, wherein said mixture of first and second anionic water-soluble substances has a viscosity of 500–2,000 cps.

7. The process according to claim 1, wherein one of the anionic water-soluble substances is used in form of anhydride or partial metal salt.

8. The process according to claim 7, wherein said salt is at least one salt selected from the group consisting of lithium, sodium-, potassium-, magnesium- and calcium-salt.

9. The process according to claim 1, wherein one of the anionic water-soluble substances is used in combination with at least one polymer selected from the group consisting of anionic or nonionic water-soluble polymers.

* * * * *